United States Patent
Chen et al.

(10) Patent No.: US 12,554,548 B2
(45) Date of Patent: Feb. 17, 2026

(54) NODE ASSESSMENT IN HCI ENVIRONMENT

(71) Applicant: Dell Products L.P., Round Rock, TX (US)

(72) Inventors: Kai Chen, Shanghai (CN); Carl Shi, Shanghai (CN); Yuyan Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 552 days.

(21) Appl. No.: 17/956,366

(22) Filed: Sep. 29, 2022

(65) Prior Publication Data
US 2024/0103927 A1    Mar. 28, 2024

(30) Foreign Application Priority Data

Sep. 19, 2022    (CN) .......................... 202211140144.8

(51) Int. Cl.
*G06F 9/50* (2006.01)
*G06F 9/54* (2006.01)

(52) U.S. Cl.
CPC .............. *G06F 9/505* (2013.01); *G06F 9/542* (2013.01)

(58) Field of Classification Search
CPC ...... G06F 9/505; G06F 9/5083; G06F 9/5088; H04L 67/1004; H04L 67/1008; H04L 67/1012; H04L 67/1029
See application file for complete search history.

(56) References Cited

U.S. PATENT DOCUMENTS

| | | | |
|---|---|---|---|
| 10,055,262 B1* | 8/2018 | Thomas | G06F 9/5083 |
| 2021/0279112 A1* | 9/2021 | Janakiraman | G06F 9/5083 |
| 2022/0300323 A1* | 9/2022 | Xu | G06F 9/4881 |
| 2022/0342888 A1* | 10/2022 | Chekuri | G06F 9/45558 |
| 2023/0266997 A1* | 8/2023 | Natarajan | G06F 9/505 718/104 |
| 2023/0362245 A1* | 11/2023 | Nijhawan | G06F 9/45541 |

* cited by examiner

*Primary Examiner* — Andy Ho
(74) *Attorney, Agent, or Firm* — Jackson Walker L.L.P.

(57) ABSTRACT

An information handling system may include at least one processor and a memory. The information handling system may be configured to assign a workload to a particular node selected from among a plurality of nodes of an information handling system cluster by: determining scores for each respective node of the plurality of nodes based on hardware metrics of the respective nodes; based on the determined scores, selecting a particular node having a highest score; and causing the workload to execute on the particular node.

15 Claims, 2 Drawing Sheets

NODE ASSESSMENT IN HCI ENVIRONMENT

TECHNICAL FIELD

The present disclosure relates in general to information handling systems, and more particularly to techniques for evaluating nodes in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In some situations, it is useful to be able to run a particular workload on a particular HCI node that has some desired characteristic(s). For example, a workload that needs a large amount of I/O bandwidth may benefit from running on a node that has local storage available to store its data set, instead of storing the data set elsewhere in the cluster and accessing it via the network. Technologies such as vSAN Direct and the like may allow a user to provide the best performing local data store to an application in a shared-nothing HCI architecture. It may further be advantageous to consider additional factors like hardware health and/or pre-existing workloads to provide suitable nodes for a user to employ when creating a new workload.

Accordingly, embodiments of this disclosure provide a node assessment framework for evaluating nodes and selecting a suitable node for a given workload.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with node assessment may be reduced or eliminated.

In accordance with embodiments of the present disclosure, an information handling system may include at least one processor and a memory. The information handling system may be configured to assign a workload to a particular node selected from among a plurality of nodes of an information handling system cluster by: determining scores for each respective node of the plurality of nodes based on hardware metrics of the respective nodes; based on the determined scores, selecting a particular node having a highest score; and causing the workload to execute on the particular node.

In accordance with these and other embodiments of the present disclosure, a computer-implemented method for assigning a workload to a particular node selected from among a plurality of nodes of an information handling system cluster may include: determining scores for each respective node of the plurality of nodes based on hardware metrics of the respective nodes; based on the determined scores, selecting a particular node having a highest score; and causing the workload to execute on the particular node.

In accordance with these and other embodiments of the present disclosure, an article of manufacture may include a non-transitory, computer-readable medium having computer-executable instructions thereon that are executable by a processor of an information handling system for assigning a workload to a particular node selected from among a plurality of nodes of an information handling system cluster by: determining scores for each respective node of the plurality of nodes based on hardware metrics of the respective nodes; based on the determined scores, selecting a particular node having a highest score; and causing the workload to execute on the particular node.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
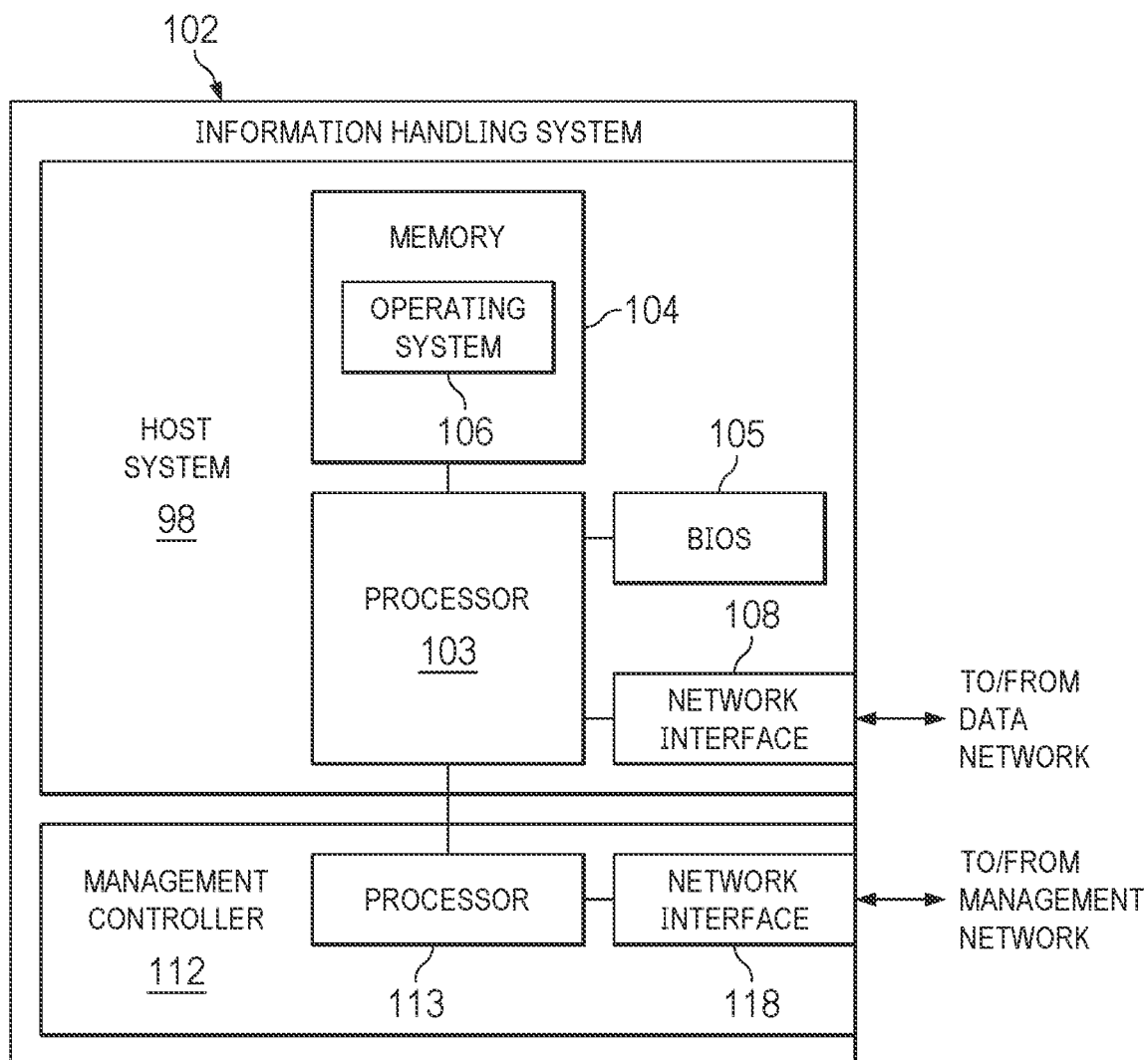
FIG. 1 illustrates a block diagram of an example information handling system, in accordance with embodiments of the present disclosure.
Figure 2:
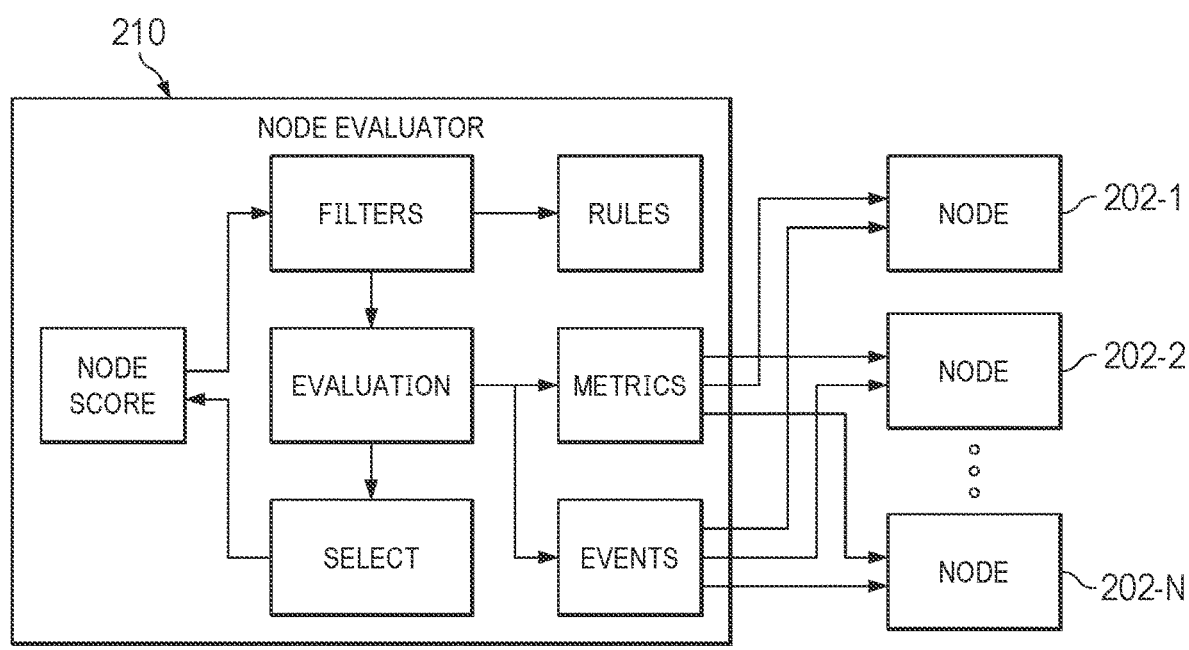
FIG. 2 illustrates a block diagram of an example cluster node assessment, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide techniques for assessing the suitability of HCI nodes for a workload (e.g., a workload executing in a VM).

FIG. 2 illustrates an example technique for calculating node scores in an HCI system, according to some embodiments. Node evaluator 210 may execute on a node of the HCI system (e.g., on a host system or on a management controller thereof). In one embodiment, node evaluator 210 may run in a VM on a particular node of an HCI system. In one embodiment, node evaluator 210 may run as part of the control plane of the HCI cluster.

Node evaluator 210 may access data regarding the state of hardware, software, and/or firmware resources of nodes 202-1 through 202-N (collectively, nodes 202). Based on the data collected, as discussed below, a node score may be calculated for each node 202. Based on the node scores, a particular node (e.g., the node with the highest score) may be selected for a given workload. For example, node evaluator 210 may select the node that is most suitable for hosting local storage for a VM workload executing on that same node.

In one embodiment, the assessment may include three steps as shown: filtering (which may be based on one or more rules), evaluation (which may be based on metrics and events), and selection.

First, one or more filters may be used to determine the set of nodes that are feasible to consider. For example, the filters may check whether a candidate node has enough available resources (e.g., storage space, CPU capacity, network bandwidth, etc.) to meet the specific resource requests. In one embodiment, the filtering may also be based on one or more rules that the user may create and/or modify based on default rules. Any nodes that do not satisfy the filtering requirements are removed from further consideration. At the conclusion of this step, a node list of one or more nodes may be generated that contains any suitable nodes.

In the evaluation step, node evaluator 210 may calculate scores for the remaining nodes in the node list, and a final score list may be generated. The scores may be based in whole or in part on metrics and events associated with the respective nodes 202.

According to a default scoring implementation, node evaluator 210 may rank the remaining nodes to choose the most suitable node. Node evaluator 210 may collect metrics and review event logs (e.g., including hardware, software, and/or firmware health events) from the nodes and assign a score to each node.

In one implementation, the metrics may include information such as CPU capacity, memory availability, storage capacity, network bandwidth, network latency, and/or any other suitable metrics.

Events may include hardware, software, and/or firmware events, typically relating to the health status of a node. In one embodiment, events may be considered to fall into one of three types: information, warning, and error. Events may be associated with a particular component of the node, such as power supply events, memory events, fan events, storage events, network events, general system events, etc.

For each metric and each event, a score may be calculated. For example, each score may range from 0 to 100 in one implementation. Further, each metric and event may have a weight associated therewith, such that more important types of metric and event may be weighted more heavily than less important types. For example, each weight may range from 0 to 1.0 in one implementation.

In one embodiment, the figure of merit for the i'th category may be the product of the respective score $S_i$ and the corresponding weight $W_i$. The overall score for a node may then be calculated by combining the results in each of N categories. In one implementation, the results may be combined by using a harmonic mean:

$$NodeScore = \frac{N}{\sum_{i=1}^{N} \frac{1}{S_i * W_i}}$$

In some implementations, the user may define custom entries for the metrics and events, custom weightings, other formulas for combining the individual results, etc. One of ordinary skill in the art with the benefit of this disclosure will understand that the formula discussed above is one possible scoring implementation, but any other suitable manner of scoring may be employed as desired.

Once the node score for each node has been calculated, node evaluator 210 may select the node with the highest score as the most suitable for the workload in question. In the event that multiple nodes exhibit a tie for the highest score, node evaluator 210 may select from among them in any suitable manner (e.g., randomly or pseudo-randomly).

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to assign a workload to a particular node selected from among a plurality of nodes of an information handling system cluster by:
   filtering the plurality of nodes to remove any nodes that are determined to have insufficient resources available for the workload or that are in conflict with one or more user-specified rules;
   determining scores for each respective node of the filtered plurality of nodes based on hardware metrics of the respective nodes, wherein the scores are determined based on a harmonic mean of a plurality of individual hardware metric scores;
   based on the determined scores, selecting a particular node having a highest score; and
   causing the workload to execute on the particular node.

2. The information handling system of claim 1, wherein the cluster is a hyper-converged infrastructure (HCI) cluster.

3. The information handling system of claim 1, wherein the particular node includes a local physical storage resource configured to store data associated with the workload.

4. The information handling system of claim 1, wherein the scores are further based on event logs of the respective nodes.

5. The information handling system of claim 1, wherein the scores are further based on configurable weights associated with the hardware metrics.

6. A computer-implemented method for assigning a workload to a particular node selected from among a plurality of nodes of an information handling system cluster, the method comprising:
   filtering the plurality of nodes to remove any nodes that are determined to have insufficient resources available for the workload or that are in conflict with one or more user-specified rules;
   determining scores for each respective node of the filtered plurality of nodes based on hardware metrics of the respective nodes, wherein the scores are determined based on a harmonic mean of a plurality of individual hardware metric scores;
   based on the determined scores, selecting a particular node having a highest score; and
   causing the workload to execute on the particular node.

7. The method of claim 6, wherein the cluster is a hyper-converged infrastructure (HCI) cluster.

8. The method of claim 6, wherein the particular node includes a local physical storage resource configured to store data associated with the workload.

9. The method of claim 6, wherein the scores are further based on event logs of the respective nodes.

10. The method of claim 6, wherein the scores are further based on configurable weights associated with the hardware metrics.

11. An article of manufacture comprising a non-transitory, computer-readable medium having computer-executable instructions thereon that are executable by a processor of an information handling system for assigning a workload to a particular node selected from among a plurality of nodes of an information handling system cluster by:
    filtering the plurality of nodes to remove any nodes that are determined to have insufficient resources available for the workload or that are in conflict with one or more user-specified rules;
    determining scores for each respective node of the filtered plurality of nodes based on hardware metrics of the respective nodes, wherein the scores are determined based on a harmonic mean of a plurality of individual hardware metric scores;
    based on the determined scores, selecting a particular node having a highest score; and
    causing the workload to execute on the particular node.

12. The article of claim 11, wherein the cluster is a hyper-converged infrastructure (HCI) cluster.

13. The article of claim 11, wherein the particular node includes a local physical storage resource configured to store data associated with the workload.

14. The article of claim 11, wherein the scores are further based on event logs of the respective nodes.

15. The article of claim 11, wherein the scores are further based on configurable weights associated with the hardware metrics.

* * * * *